US005544774A

United States Patent [19]
Gray

[11] Patent Number: 5,544,774
[45] Date of Patent: Aug. 13, 1996

[54] METHOD OF ELIMINATING POLE RECESSION IN A THIN FILM MAGNETIC HEAD

[75] Inventor: G. Robert Gray, Fremont, Calif.

[73] Assignee: AIWA Research and Development, Inc., Fremont, Calif.

[21] Appl. No.: 296,389

[22] Filed: Aug. 26, 1994

[51] Int. Cl.$^6$ ..................................................... B44C 1/22
[52] U.S. Cl. ............................. 216/22; 216/67; 252/79.1
[58] Field of Search .................................. 216/22, 67, 74; 156/643.1, 655.1, 656.1, 657.1; 629/603; 252/79.1; 360/103, 113, 122, 125, 126

[56] References Cited

U.S. PATENT DOCUMENTS

| | | | |
|---|---|---|---|
| 3,723,665 | 3/1973 | Lazzari et al. | 179/100.2 C |
| 4,414,554 | 11/1983 | Springer | 346/74.5 |
| 4,470,051 | 9/1984 | Springer | 346/74.5 |
| 4,494,125 | 1/1985 | Springer | 346/74.5 |
| 4,503,439 | 3/1985 | Springer | 346/74.5 |
| 4,503,440 | 3/1985 | Springer | 346/74.5 |
| 4,517,616 | 5/1985 | Bischoff | 360/126 |
| 4,539,280 | 9/1985 | Springer | 430/39 |
| 4,544,421 | 10/1985 | Springer | 148/103 |
| 4,639,289 | 1/1987 | Lazzari | 156/643 |
| 4,652,954 | 3/1987 | Church | 216/22 X |
| 4,749,439 | 6/1988 | Kobayashi et al. | 216/22 |
| 4,809,103 | 2/1989 | Lazzari | 360/103 |
| 4,837,924 | 6/1989 | Lazzari | 29/603 |
| 4,841,624 | 6/1989 | Togawa et al. | 216/22 X |
| 4,901,177 | 2/1990 | Lazzari | 360/113 |
| 4,912,584 | 3/1990 | Mallary et al. | 360/126 |
| 4,942,490 | 7/1990 | Lehureau | 360/126 |
| 4,949,207 | 8/1990 | Lazzari | 360/119 |
| 4,970,615 | 11/1990 | Gau | 360/122 |
| 4,984,118 | 1/1991 | Springer | 360/125 |
| 4,992,897 | 2/1991 | Deroux-Dauphin | 360/103 |
| 5,020,212 | 6/1991 | Michijima et al. | 29/603 |
| 5,041,932 | 8/1991 | Hamilton | 360/104 |
| 5,065,271 | 11/1991 | Matsuura et al. | 360/126 |
| 5,073,242 | 12/1991 | Hamilton | 204/192.22 |
| 5,090,111 | 2/1992 | Lazzari | 29/603 |
| 5,111,351 | 5/1992 | Hamilton | 360/104 |
| 5,163,218 | 11/1992 | Hamilton | 29/603 |
| 5,166,845 | 11/1992 | Thompson et al. | 360/103 |

(List continued on next page.)

OTHER PUBLICATIONS

A. Sano, M. Egawa, M. Nitta, K. Takayanagi, T. Matsushita, and T. Fujita, A Low Inductance Metal–In–Gap Head Using A Side–Core Concept, ©1993, IEEE Transactions on Magnetics, vol. 29, No. 6, pp. 3888–3890.

K. L. Mittal, Factors Affecting Adhesion of Lithographic Materials, Solid State Technology, May 1979, pp. 89–100.

J. P. Lazzari and P. Deroux–Dauphin, A New Thin Film Head Generation IC Head, IEEE Transactions on Magnetics, vol. 25, No. 5, Sep. 1989, pp. 3173–3193.

*Primary Examiner*—William Powell
*Attorney, Agent, or Firm*—Skjerven, Morrill, MacPherson, Franklin & Friel

[57] ABSTRACT

A method for fabricating a thin film magnetic head is provided in which a magnetic yoke assembly is built up, layer by layer, atop a substrate using semiconductor thin film techniques. The lower yoke assembly is first formed and includes a lower magnetic layer situated on the substrate and first and second side poles built up vertically from the ends of the lower magnetic layer. An insulative pedestal surrounded by a frame is formed at the top of the lower yoke assembly and extends above the uppermost lateral plane of the yoke assembly. First and second pole pieces are plated on the first and second side poles through openings in the pedestal. A diamond-like carbon (DLC) protective wear layer is deposited atop the pedestal and pole pieces. The wear layer and pole pieces are machined to form the upper head surface. The magnetic pole pieces recede below the surface of the wear layer during machining. The wear layer is then plasma etched until the wear layer and the pole pieces are in substantially the same plane. In this manner, the head is provided with wear protection and at the same time the pole pieces are so close to the magnetic recording media that the reading and writing of data are enhanced.

10 Claims, 6 Drawing Sheets

U.S. PATENT DOCUMENTS

| | | | |
|---|---|---|---|
| 5,168,408 | 12/1992 | Lazzari | 360/113 |
| 5,189,580 | 2/1993 | Pisharody et al. | 360/126 |
| 5,195,006 | 3/1993 | Morikawa | 360/126 |
| 5,196,976 | 3/1993 | Lazzari | 360/113 |
| 5,198,948 | 3/1993 | Stover et al. | 360/124 |
| 5,202,863 | 4/1993 | Miyatake et al. | 369/13 |
| 5,208,716 | 5/1993 | Lazzari | 360/113 |
| 5,216,559 | 6/1993 | Springer | 360/106 |
| 5,224,260 | 7/1993 | Fedeli et al. | 29/603 |
| 5,260,845 | 11/1993 | Takayama et al. | 360/103 |
| 5,266,409 | 11/1993 | Schmidt et al. | 428/446 |
| 5,274,521 | 12/1993 | Miyauchi et al. | 360/119 |

METHOD OF ELIMINATING POLE RECESSION IN A THIN FILM MAGNETIC HEAD

CROSS REFERENCE TO RELATED PATENT APPLICATIONS

This patent application is related to the copending patent application entitled "METHOD OF FABRICATING A THIN FILM MAGNETIC HEAD INCLUDING LAYERED MAGNETIC SIDE POLES", Ser. No. 08/297,187 by Malhotra et al., filed concurrently herewith on Aug. 26, 1994 and assigned to the same assignee, the disclosure of which is incorporated herein by reference.

BACKGROUND OF THE INVENTION

1. Field of the Invention

This invention relates in general to techniques for the fabrication of magnetic recording and playback heads and, more particularly, to the fabrication of thin film magnetic recording and playback heads.

2. Description of Related Art

In the continuing drive for increased storage density in magnetic media storage devices, thin film magnetic heads have been developed. As opposed to earlier types of magnetic heads, the fabrication of which involves significant piecework and manual handling of individual parts, thin film magnetic heads take advantage of semiconductor fabrication processes to form a large number of heads simultaneously on a common substrate or wafer.

Figure 1:
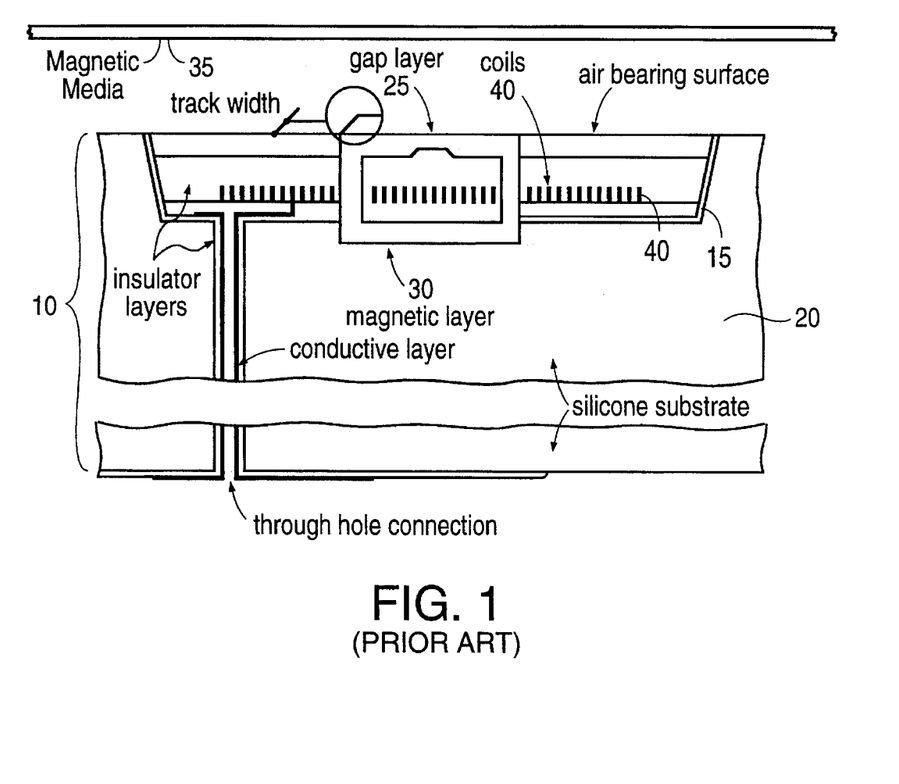
FIG. 1 is a cross section of a conventional thin film magnetic head.

One such head which is formed by a semiconductor thin film process is disclosed in the article, "A New Thin Film Head Generation IC Head" by J. P. Lazzari et al., IEEE Transactions on Magnetics, Vol. 25, No. 5, September 1989. A cross-sectional view of the Lazzari head is illustrated in FIG. 1 as head 10. Head 10 is fabricated within a recess 15 in a silicon substrate 20. A gap 25 is shown in the uppermost portion of a magnetic layer or yoke 30 situated within recess 15. Head 10 is shown positioned adjacent magnetic recording media 35. A magnetic coil 40 is wound around magnetic yoke 30. A plurality of sliders with respective heads 10 thereon are fabricated from a common silicon wafer substrate using semiconductor thin film processes. The sliders are then diced up into individual slider assemblies.

Unfortunately, thin film magnetic heads are subject to substantial wear when the head contacts magnetic recording media such as tape, for example. Over time, this wear can be very considerable and ultimately may be a cause for head failure if accumulated wear significantly damages the head. Structures which reduce head wear are very desirable.

SUMMARY OF THE INVENTION

One advantage of the method for fabricating a thin film head of the present invention is significantly reduced head wear.

Another advantage of the method of fabricating a thin film head is that in the resultant head, the pole pieces of the head can be placed very close to the magnetic recording media.

Yet another advantage of the method of fabricating a thin film head is that the head can be fabricated in large quantities using thin film semiconductor fabrication equipment.

In accordance with one embodiment of the present invention, a method of fabricating a thin film magnetic head on a substrate includes the step of forming a lower pole member of magnetic material on the substrate, the lower pole member including first and second ends. The method also includes the step of forming first and second side pole members of magnetic material at the first and second ends, respectively, of the lower pole member, the first and second side pole members being built up from a plurality of layers of magnetic material deposited layer upon layer, the first and second side pole members including tops and bottoms. The method also includes the step of forming a conductor coil around one of the first and second side pole members while the first and second side pole members are being formed, the conductor coil being separated from the first and second side pole members by insulative layers. The method further includes the step of forming first and second pole piece members of magnetic material at the tops of the first and second side pole members, respectively, the first and second pole piece members facing each other and forming a gap region therebetween. The method still further includes the step of depositing a durable wear layer on the first and second pole piece members and an area of the head surrounding the first and second pole piece members. The method also includes the step of machining the durable wear layer, the gap region, and the first and second pole piece members such that the first and second pole piece members recede to a greater extent than the durable wear layer. The method still further includes the step of plasma etching the durable wear layer down to the level of the first and second pole piece members such that the durable wear layer and the first and second pole piece members are in the same plane.

BRIEF DESCRIPTION OF THE DRAWINGS

The features of the invention believed to be novel are specifically set forth in the appended claims. However, the invention itself, both as to its structure and method of operation, may best be understood by referring to the following description and accompanying drawings.

DETAILED DESCRIPTION OF THE INVENTION

FIG. 2A–7 illustrate stages in the fabrication of a thin film magnetic head 100 which is manufactured as described in detail in the copending patent application entitled "THIN FILM MAGNETIC HEAD INCLUDING LAYERED MAGNETIC SIDE POLES" by Arun Malhotra, G. Robert Gray, James Watterston and Jane Ang,(Malhotra et al., Ser. No. 08/297,186), which is incorporated herein by reference, and which is filed concurrently with this document and assigned to the same assignee.

Figure 2A:
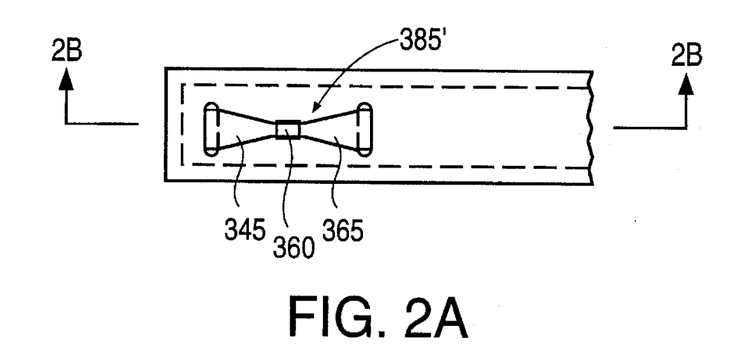
FIG. 2A is a top plan view of a portion of a thin film magnetic head after completion of the pole structure.
Figure 2B:
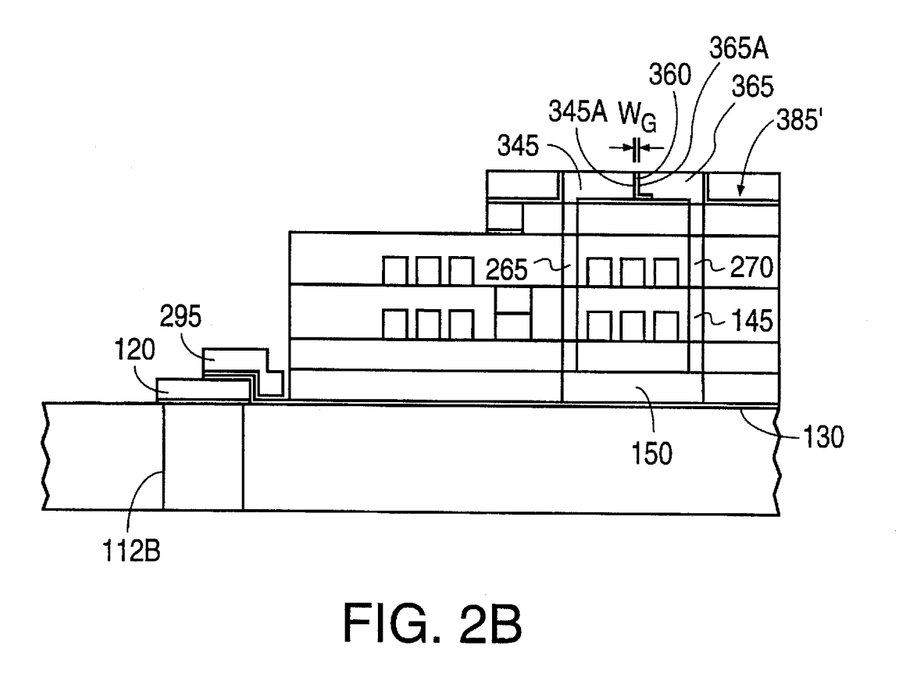
FIG. 2B is a cross-sectional view of the thin film head of FIG. 2A taking along section line 2B—2B.

FIG. 2B is a cross-sectional view of thin film magnetic head 100 taken along a section line 2B—2B as indicated in the plan view of the pole region of the head shown in FIG. 2A. Thin film head 100 is fabricated using relatively soft magnetic material to form the magnetic pole portions (150, 265, 270, 345, 365) of magnetic yoke 145. For example, NiFe, can be used to fabricate the pole portions using the layer by layer build-up approach described in detail in the above-cited patent application. It is found to be desirable to place a layer of hard protective material 385 adjacent the upper magnetic pole region where the head contacts the magnetic media to reduce undesired head wear. For example, diamond-like carbon (DLC) can be used as a wear layer adjacent the upper magnetic pole region. Unfortunately, when the DLC layer 385 is machined to form machined DLC wear layer 385' with the head surface shown in FIG. 2B, the adjacent soft magnetic material which forms the pole region (345, 365) tends to be machined down to a greater extent than the hard DLC layer 385'. This problem is referred to as pole recession. In other words, during machining, the soft magnetic pole material recedes to a greater extent than the hard DLC wear layer.

Figure 3:
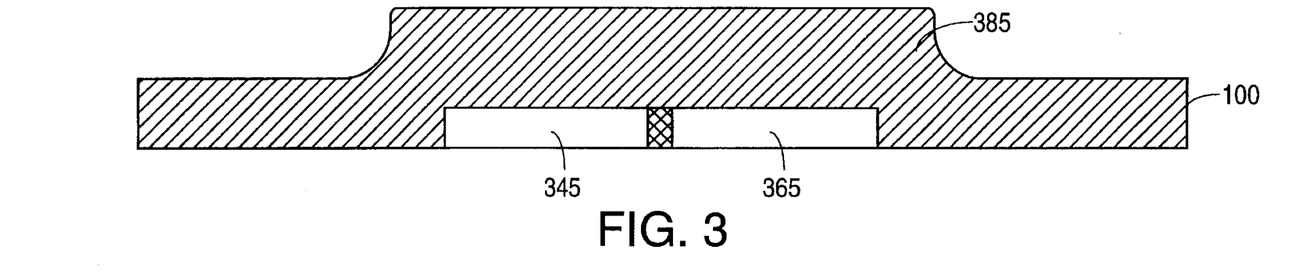
FIG. 3 is a cross-sectional view of the uppermost portion of the thin film head of FIG. 2B after application of a protective wear layer to the uppermost surfaces thereof.
Figure 4:
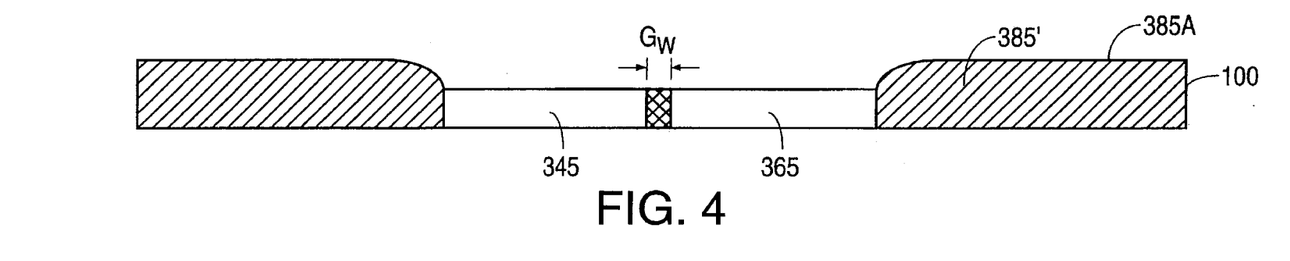
FIG. 4 is a cross-sectional view of the thin film head of FIG. 3 after the upper surface of the protective wear layer is machined.

FIG. 3 is a close-up representation of the uppermost portion of head 100 showing a DLC wear layer 385 prior to machining. FIG. 4 is a close-up representation of the uppermost portion of head 100 showing a DLC wear layer 385 after machining to form machined DLC wear layer 385'. Pole recession is evident in head 100 of FIG. 4. If the problem of pole recession is not properly addressed, the pole region of the resultant head may not be sufficiently close to the recording media to record and playback correctly. A method is disclosed herein for solving the problem of pole recession on a thin film magnetic head such as head 100, for example. The fabrication steps for thin film head 100 are first summarized.

Figure 5A:
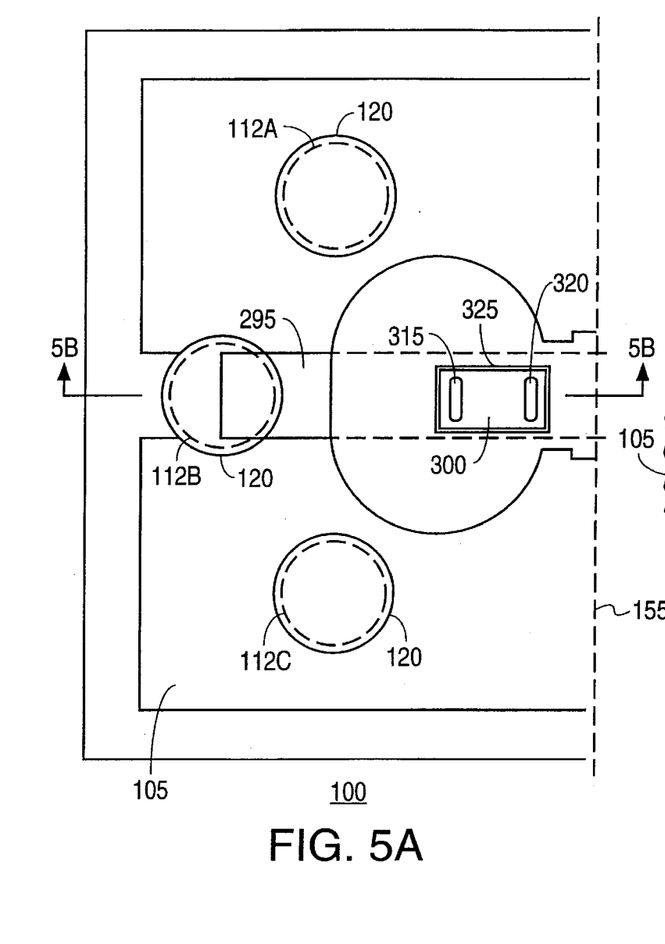
FIG. 5A is a top plan view of a partially complete thin film magnetic head after the side poles are formed.
Figure 5B:
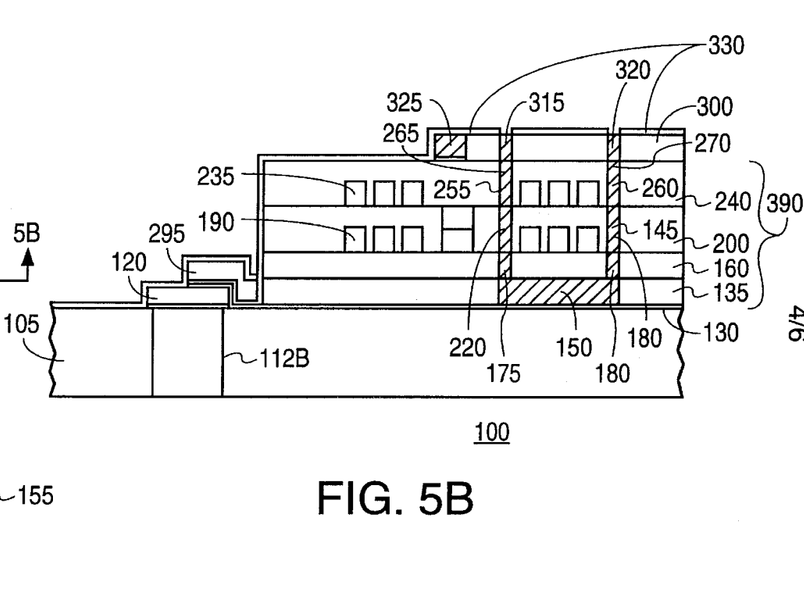
FIG. 5B is a cross-sectional view of the head of FIG. 5A taken along section line 5B—5B.

As seen in FIGS. 5A and 5B, thin film head 100 includes an alumina substrate 105 in which via holes are formed for receiving electrically conductive via connective members 112A, 112B and 112C. Via connective members 112A, 112B and 112C are covered by via caps 120 which protect the via connective members from etchants used in subsequent etching steps. Via connective member 112B connects to the ground of head 100. Via connective members 112A and 112C connect to respective ends of lower coil layer 190 and upper coil layer 235.

A magnetic yoke 145 is built up, layer by layer, in successive plating operations on a seed layer 130 of conductive material disposed on the upper surface of substrate 105. One magnetic material which may be used as the material for magnetic yoke 145 is nickel-iron (NiFe). Bottom magnetic layer 150 is plated in an opening in an insulative layer 135 which is situated atop seed layer 130. First magnetic side pole 265 is built up, layer by layer, at one end of bottom magnetic layer 150 while second magnetic side pole 270 is built up, layer by layer, at the other end of bottom magnetic layer 150 as shown in FIG. 5B. More specifically, each of the magnetic layers 175, 220, 255 and 315 which together form first side pole 265 are built up in open regions in respective insulative layers 160, 200, 240 and 300. Likewise, each of the magnetic layers 180, 225, 260 and 320 which together form second side pole 270 are built up in open regions in respective insulative layers 160, 200, 240 and 300. Thus, magnetic yoke 145 is formed by bottom magnetic layer 150, magnetic layers 175, 220, 255, 315 and magnetic layers 180, 225, 260 and 320, all of which are plated using common seed layer 130 as an electrode.

Magnetic yoke 145 together with insulative layers 135, 160, 200 and 240, form a main body 390 from which insulative layer 300 protrudes or extends. Insulative layer 300 thus forms a pedestal and is alternatively referred to as pedestal 300 or protrusion 300. One embodiment of head 100 includes a grounding strip 295 which couples via connective member 112B to magnetic yoke 145 by the electrically conductive path through seed layer 130. Grounding strip 295 may be omitted if grounding of head 100 is not desired for a particular application.

A frame 325 of magnetic material, for example NiFe, is patterned and plated around insulative pedestal 300 at the same time that magnetic side pole portions 315 and 320 are plated. Frame 325 exhibits a substantially rectangular shape in this particular embodiment and surrounds insulative pedestal 300 which forms the inner boundary of frame 325 as seen in FIG. 5A.

A CrNiV seed layer 330 is sputtered on the exposed upper surfaces of head 100. Seed layer 330 is patterned to expose side poles 265 and 270 by leaving open regions above side poles 265 and 270 when seed layer 330 is formed. More specifically, to actually form seed layer 330, a "lift-off" process is used. In this "lift-off" process, a layer of photoresist (not shown) is patterned on head 100 to cover the region above side poles 265 and 270. Seed layer 330 is then sputtered on the entire upper surface of the partially completed head 100. The photo-resist which covers the open regions above side poles 265 and 270 is now "lifted-off" head 100. To accomplish this lift-off, the partially complete head 100 is placed in an ultrasonic bath including a photoresist solvent such as acetone, for example. The seed layer 330 is sufficiently thin such that it does not the cover photoresist layer above side poles 265 and 270 very well. In this manner, there are sufficient avenues of attack by which the solvent can get through seed layer 330 at the edges of the photoresist layer to dissolve the photoresist layer at side poles 265 and 270. When the photoresist layer at side poles 265 and 270 is thus dissolved, the portions of seed layer 330 immediately above side poles 265 and 270 lift-off and float away. The region of head 100 at side poles 265 and 270 is thus void of seed layer 330 as shown in FIG. 5B.

Figure 6A:
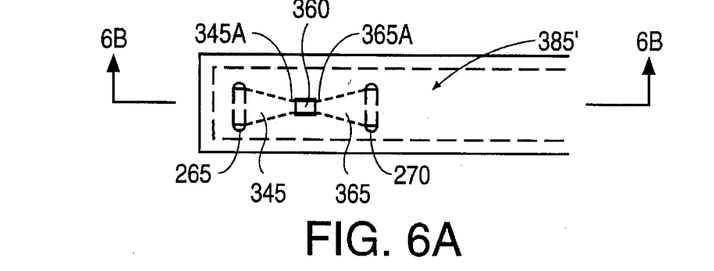
FIG. 6A is a top plan view of the pole region of the thin film head after the poles are formed and coated with a protective wear layer.
Figure 6B:
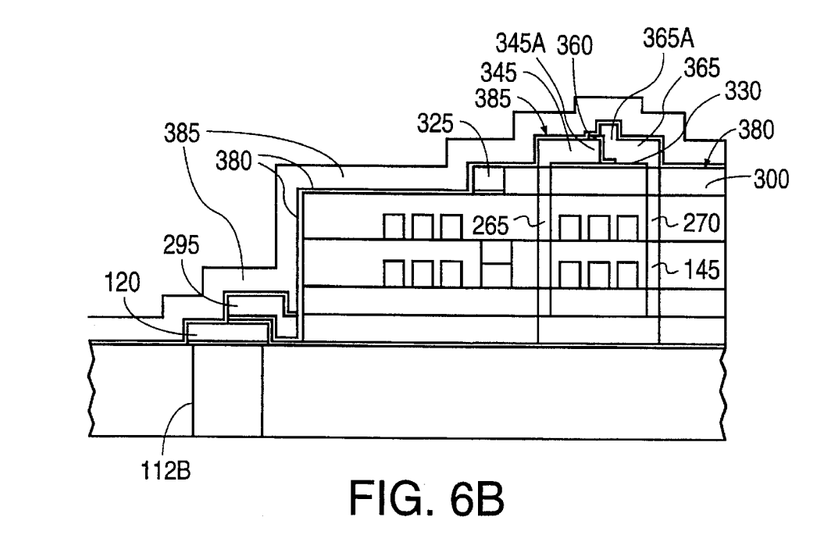
FIG. 6B is a cross-sectional view of the head of FIG. 6A taken along section line 6B—6B.

A first magnetic pole 345 is patterned and plated on first side pole 265 as shown in FIG. 6B. First magnetic pole 345 includes a pole end 345A extending away from first side pole 265 as shown in FIG. 6A. A substantially rectangular gap region 360 of nonmagnetic material is plated or otherwise formed adjacent pole end 345A. One nonmagnetic material which may be used to fabricate gap region 360 is NiP. A second magnetic pole 365 is patterned and plated on side pole 270 at the top of magnetic yoke 145. Second magnetic pole 365 includes a pole end 365A extending away from second side pole 270 and facing gap region 360.

Figure 7:
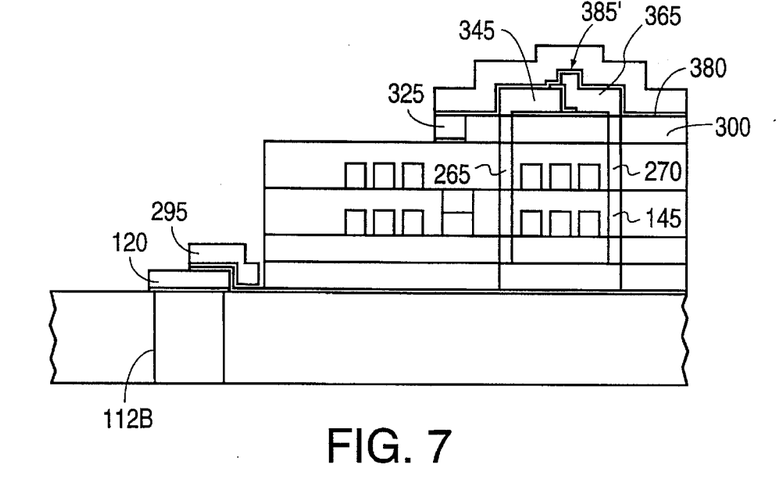
FIG. 7 is a cross-sectional view of the head of FIG. 6B after the protective wear layer is removed from the head except for the pole region and pedestal region.

A silicon adhesion layer 380 is sputtered on the exposed upper surface of head 100 as shown in FIG. 6B. A diamond-like carbon (DLC) wear layer 385 is then deposited on adhesion layer 380. Adhesion layer 380 enables DLC layer 385 to stick to the upper surface of head 100. This silicon adhesion layer typically exhibits a thickness within the range of approximately 400 Å to approximately 1000 Å. This silicon adhesion layer exhibits a nominal thickness of approximately 600 Å in a preferred embodiment. DLC layer 385 covers at least the top of magnetic yoke 145 and the upper head region immediately surrounding poles 345 and 365. In other words, DLC layer 385 covers a sufficiently large region around poles 345 and 365 to provide wear protection thereto. As seen in FIG. 6A and more clearly in FIG. 6B, DLC layer 385 covers magnetic yoke 145 and insulative pedestal 300. DLC layer 385 is patterned and both DLC layer 385 and adhesion layer 380 are reactive ion etched to leave a DLC wear layer 385' over magnetic yoke 145 and insulative pedestal 300 as shown in FIG. 7.

Protective wear layer 385' covers at least the top of magnetic yoke 145 and the immediately surrounding area of the head. More particularly, as seen in FIG. 7B, a hard protective wear layer 385 covers magnetic yoke 145 and insulative pedestal 300. Protective layer 385 exhibits a Knoop hardness greater than 700 Knoop and preferably greater than 800 Knoop. The hardness of protective layer should be within the range of greater than approximately 700 Knoop to approximately 2000 Knoop. One material that is satisfactory for formation of protective wear layer 385 is diamond like carbon (DLC).

To form such a DLC wear layer 385, DLC layer 385 is chemically vapor deposited and patterned. More specifically, both DLC layer 385 and adhesion layer 380 are reactive ion etched to leave a DLC wear layer 385' over magnetic yoke 145 and insulative pedestal 300 as shown in FIG. 7. Prior to exposing head 100 to this reactive ion etch, the upper surface of head 100 is covered with a layer of photoresist (not shown). The photoresist layer is patterned to include unprotected open regions for those portions of the head external to frame 325. In this manner, when the head is subjected to the reactive ion etch, the portion of DLC layer 385 external to frame 325 is etched away and the remaining portion of DLC layer 385 is protected and remains as DLC layer 385'.

More detail is now provided with respect to the formation of DLC protective wear layer 385. Before DLC protective wear layer 385 is actually laid down on silicon adhesion layer 380, adhesion layer 380 is sputter cleaned. In the course of performing this sputter cleaning, approximately 200 Å of the upper surface of silicon adhesion layer 380 is removed. More particularly, the silicon adhesion layer is sputter cleaned in a SAMCO plasma machine, Model No. PD-200D (Plasma Enhanced CVD System For DLC Deposition and Etching), hereafter the "plasma machine". This sputter cleaning is performed with Argon in a plasma within the plasma machine vessel at a pressure of 70 mTorr with 180 watts RF input power at a frequency of 13.56 MHz. The flow rate of Argon is approximately 100 sccm. The partially complete head 100 is situated on a 6 inch diameter cathode (ie. the energized electrode) of the SAMCO plasma machine, Model PD-200D, for approximately 3 to approximately 4 minutes.

Immediately after the Argon plasma cleaning (sputter etching) is complete, the input power is reduced to 110–150 Watts to the same 6 inch cathode electrode. The Argon source is turned off and a source of liquid hydrocarbon DLC source material is turned on. For example, one DLC source material that may be used is Part No. S-12 available from SAMCO, Sunnyvale, Calif. The pressure within the vessel is approximately 20 approximately 25 mTorr at a flow rate of source material of approximately 25 cm$^3$/min. Although the temperature is not specifically controlled during this process, the wafer on which the head is fabricated is situated on a water-cooled cathode while in the plasma machine. Under these conditions, a DLC deposition rate of approximately 1000 Å/min is obtained which is maintained until the desired DLC thickness is reached, namely approximately 5μ.

DLC fabricated in this manner results in a DLC layer 385 with a Knoop hardness of approximately 800. It is found that DLC layer Knoop hardnesses of greater than 700 up to approximately 2000 Knoop produce and acceptably hard wear layer 385 for wear protection purposes. DLC wear layer 385 is then reactive ion etched as described to form DLC wear layer 385'.

DLC wear layer 385' is machined or lapped as shown in FIG. 2B to expose magnetic gap region 360 as shown in both FIG. 2A and 2B. DLC wear layer 385' protects head 100, specifically gap region 360 and magnetic poles 345 and 365 from wear when head 100 is brought into contact with a magnetic media for recording or playback purposes. By using the techniques described herein, very narrow gap regions can be produced. The gap width, $W_G$, is defined to be the width of gap region 360, namely the distance between gap end 345A and gap end 365A as seen in FIG. 2B.

Figure 8:
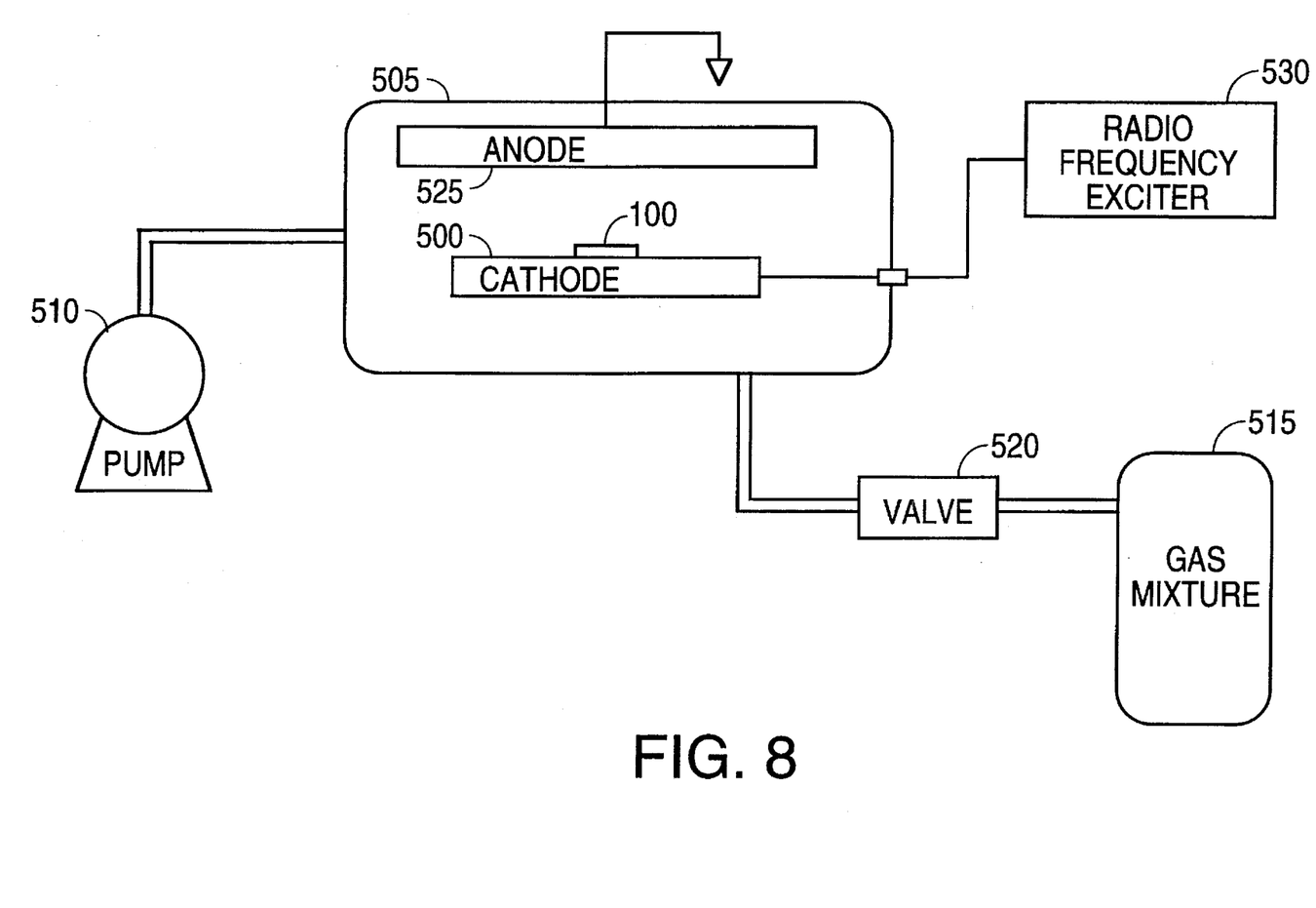
FIG. 8 is a block diagram of apparatus for etching the wear layer of the thin film head of FIG. 7.

Unfortunately, as discussed earlier, when the upper surface of head 100 is machined in this manner, the soft pole material of poles 345 and 365 may recede below the plane of upper wear layer surface 385A as shown in FIG. 4. When this condition occurs, poles 345 and 365 may not be as near to the magnetic media as desirable. To correct this condition, after the machining or lapping step, head 100 or an array of heads 100 on a common substrate is placed on a cathode 500 in an enclosed chamber 505 suitable for plasma etching as shown in FIG. 8. A vacuum pump 510 is coupled to chamber 505 and is activated to pump down and maintain the pressure in chamber 505 within the range of approximately $8 \times 10^{-2}$ Torr to approximately $1 \times 10^{-1}$ Torr.

Chamber 505 is filled with a gas mixture suitable for plasma etching of DLC wear layer 385'. This gas mixture is supplied to chamber 505 by a gas mixture supply 515 which is coupled to chamber 505 by a valve 520. Suitable gas mixtures for supply 515 are oxygen, or oxygen and chlorofluoro carbon, or oxygen and fluorocarbon gas, for example. The etching gas pressure is set between approximately $1 \times 10^{-2}$ Torr and $1 \times 10^{-1}$ Torr.

Radio frequency electrodes 525, namely cathode 500 and anode 525, are situated within chamber 505. Electrodes 525 are coupled to a radio frequency exciter 530 which excites electrodes 525 with a radio frequency signal exhibiting a frequency of approximately 13.56 MHz. Acceptable power density output levels for radio frequency exciter 530 are found to be within the range of approximately 0.5 Watts/cm$^2$ to approximately 1.4 Watts/cm$^2$, for example. The radio frequency power supplied to electrodes 525 must be sufficiently large to excite the gas mixture within chamber 505 into a plasma and to etch the DLC or other substance employed for wear layer 385'. The DLC wear layer 385' is etched at the controlled rate of 100–500 Å/minute so as to not damage magnetic poles 345 and 365. The amount of DLC wear layer removed is usually less than approximately 500 Å and in general the plasma etching time is less than approximately 5 minutes. At the low power density used at a pressure of approximately $1 \times 10^{-2}$ Torr, there does not appear to be significant heating of the head being etched, nor does the oxygen-based plasma attack the exposed NiFe pole material.

Figure 9:
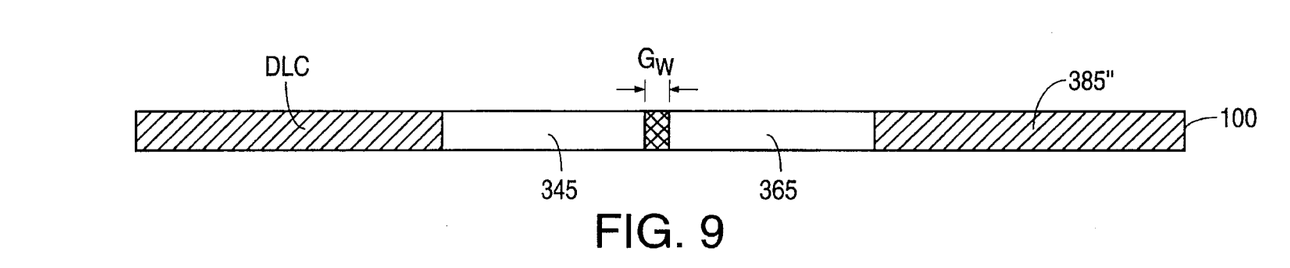
FIG. 9 is cross-sectional view of the uppermost portion of head 100 after the wear layer is etched.

Etching is continued until wear layer 385' is at substantially the same height as the exposed upper surface of magnetic poles 345 and 365. In this manner, wear layer 385' becomes substantially level with magnetic poles 345 and 365. After etching, the wear layer is designated as etched wear layer 385" as shown in FIG. 9. At this height, poles 345 and 365 will be as close to the magnetic media as possible and yet head wear protection will still be provided by wear layer 385". In this particular embodiment, the thickness of magnetic poles 345 and 365 is approximately 5μ and the thickness of etched wear layer 385" is approximately 5μ.

A method of eliminating pole recession in a thin film magnetic head is thus provided. The disclosed thin film head fabrication process results in a head which features significantly reduced head wear. The disclosed fabrication process also achieves a thin film head in which the poles are close to the media used for recording and playback. Advantageously, the disclosed process can be used to fabricate large quantities of wear-resistant thin film heads using thin film semiconductor fabrication equipment.

While only certain preferred features of the invention have been shown by way of illustration, many modifications and changes will occur. It is, therefore, to be understood that the present claims are intended to cover all such modifications and changes which fall within the true spirit of the invention.

What is claimed is:

1. A method of fabricating a thin film magnetic head on a substrate comprising the steps of:

forming a lower pole member of magnetic material on the substrate, the lower pole member including first and second ends;

forming first and second side pole members of magnetic material at the first and second ends, respectively, of the lower pole member, the first and second side pole members being built up from a plurality of layers of magnetic material deposited layer upon layer, the first and second side pole members including tops and bottoms;

forming a conductor coil around one of the first and second side pole members while the first and second side pole members are being formed, the conductor coil being separated from the first and second side pole members by insulative layers;

forming first and second pole piece members of magnetic material at the tops of the first and second side pole members, respectively, the first and second pole piece members facing each other and forming a gap region therebetween;

depositing a durable wear layer on the first and second pole piece members and an area of the head surrounding the first and second pole piece members;

machining the durable wear layer, the gap region, and the first and second pole piece members such that the first and second pole piece members recede to a greater extent than the durable wear layer; and plasma etching the durable wear layer down to the level of the first and second pole piece members such that the durable wear layer and the first and second pole piece members are in the same plane.

2. The method of claim 1 wherein the plasma etching step includes the steps of:

placing the head in an enclosed chamber; and pumping the chamber down to a pressure within the range of approximately $8\times10^{-2}$ Torr to approximately $1\times10^{-1}$ Torr.

3. The method of claim 2 further comprising the step of filling the chamber with a gas mixture suitable for plasma etching the durable wear layer and maintaining the pressure within the chamber within the range of approximately $8\times10^{-2}$ Torr to approximately $1\times10^{-1}$ Torr.

4. The method of claim 3 wherein the gas is selected from the group consisting of air-oxygen, oxygen and chlorofluoro carbon, and oxygen and fluorocarbon gas.

5. The method of claim 3 further comprising the step of exciting the gas with radio frequency energy sufficient to etch the durable wear layer.

6. A method of fabricating a thin film magnetic head on a substrate comprising the steps of:

forming a lower pole member of magnetic material on the substrate, the lower pole member including first and second ends;

forming first and second side pole members of magnetic material at the first and second ends, respectively, of the lower pole member, the first and second side pole members being built up from a plurality of layers of magnetic material deposited layer upon layer, the first and second side pole members including tops and bottoms;

forming a conductor coil around one of the first and second side pole members while the first and second side pole members are being formed, the conductor coil being separated from the first and second side pole members by insulative layers;

forming an insulative pedestal at the tops of the first and second side pole members, the insulative pedestal extending above the plane of the insulative layers below and surrounding the tops of the first and second side pole members, said insulative pedestal including first and second openings to the tops of the first and second side pole members therebelow;

forming first and second pole piece members of magnetic material at the tops of the first and second side pole members, respectively, the first and second pole piece members facing each other and forming a gap region therebetween;

depositing a durable wear layer on the first and second pole piece members and pedestal;

machining the durable wear layer, the gap region, and the first and second pole piece members such that the first and second pole piece members recede to a greater extent than the durable wear layer; and plasma etching the durable wear layer down to the level of the first and second pole piece members such that the durable wear layer and the first and second pole piece members are in the same plane.

7. The method of claim 6 wherein the plasma etching step includes the steps of:

placing the head in an enclosed chamber; and pumping the chamber down to a pressure within the range of approximately $8\times10^{-2}$ Torr to approximately $1\times10^{-1}$ Torr.

8. The method of claim 7 further comprising the step of filling the chamber with a gas mixture suitable for plasma etching the durable wear layer and maintaining the pressure within the chamber within the range of approximately $8\times10^{-2}$ Torr to approximately $1\times10^{-1}$ Torr.

9. The method of claim 8 wherein the gas is selected from the group consisting of air-oxygen, oxygen and chlorofluoro carbon, and oxygen and fluorocarbon gas.

10. The method of claim 8 further comprising the step of exciting the gas with radio frequency energy sufficient to etch the durable wear layer.

* * * * *